(No Model.) 2 Sheets—Sheet 1.

W. H. PAYNE.
BOILER.

No. 314,467. Patented Mar. 24, 1885.

WITNESSES INVENTOR (No Model.)  W. H. PAYNE.  2 Sheets—Sheet 2.
BOILER.

No. 314,467.  Patented Mar. 24, 1885.

WITNESSES  INVENTOR

UNITED STATES PATENT OFFICE.

WILLIAM H. PAYNE, OF CAMDEN, NEW JERSEY, ASSIGNOR OF ONE-HALF TO ALVIN WILKE, OF SAME PLACE.

BOILER.

SPECIFICATION forming part of Letters Patent No. 314,467, dated March 24, 1885.

Application filed September 17, 1884. (No model.)

*To all whom it may concern:*

Be it known that I, WILLIAM H. PAYNE, a citizen of the United States, residing at Camden, in the county of Camden and State of New Jersey, have invented certain new and useful Improvements in Boilers for Vegetables and other Articles; and I do hereby declare the following to be a full, clear, and exact description of the invention, reference being had to the accompanying drawings, which form part of this specification, in which—

Figure 1:
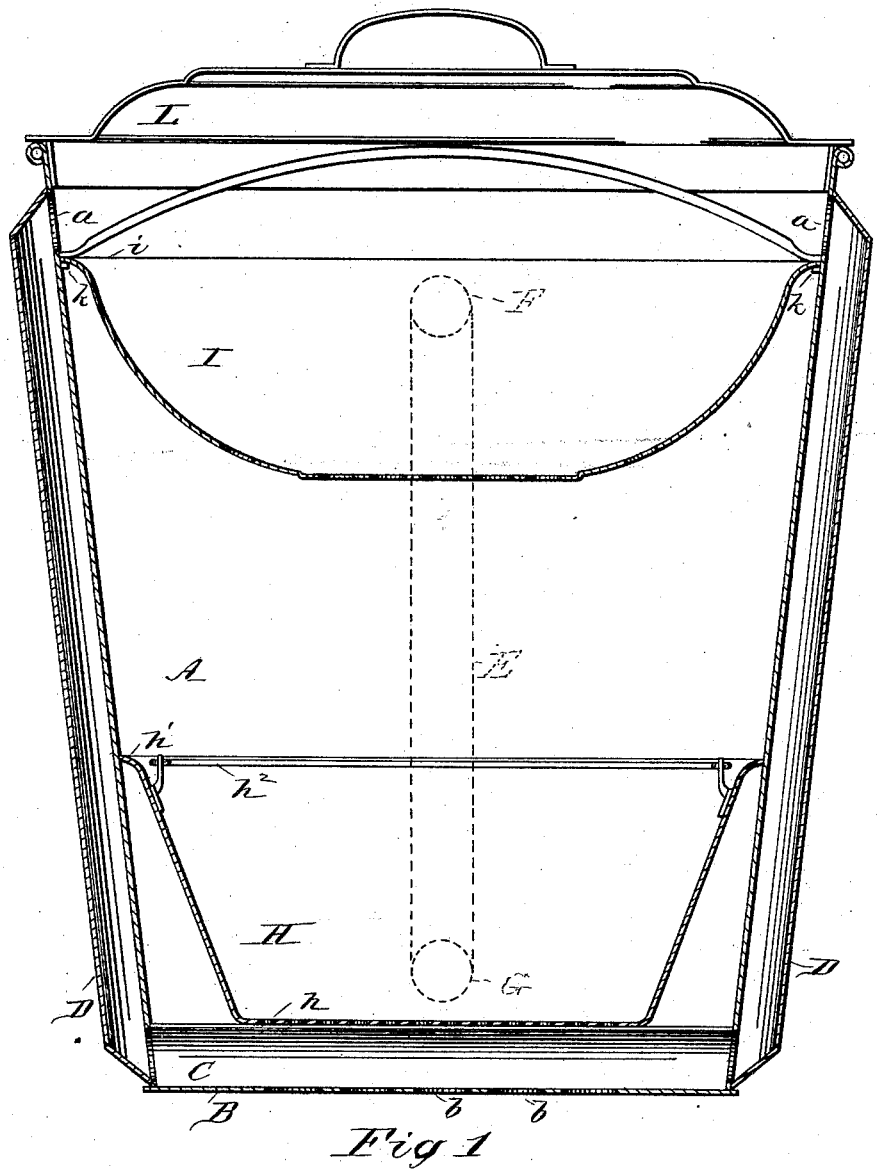
Figure 2:
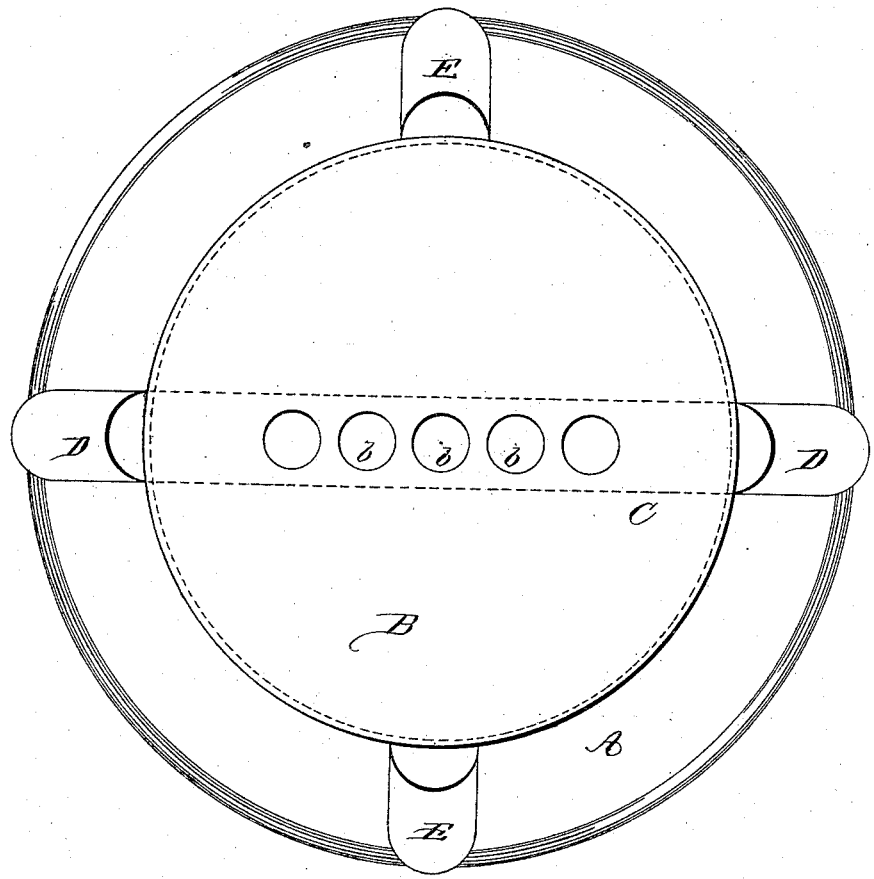

Figure 1 is a vertical central section, and Fig. 2 an inverted plan.

My invention has for its object to provide a culinary vessel or boiler of superior construction adapted and designed to prevent the escape and dissemination throughout the kitchen of offensive odors and steam from vegetables and other articles being cooked.

My invention consists in the peculiar construction and arrangement of parts, as hereinafter fully set forth and specifically claimed, having reference particularly to the following parts: First, to the pot or boiler, which consists of a vessel having externally-applied tubes, a portion of which connect at their tops and bottoms with the interior of said vessel and are designed to produce a circulation of the water therein, thereby facilitating the operation of boiling, and at the same time preventing "boiling over," the other tubes having internal communication at their upper ends with the interior of the vessel and connecting at their lower ends with a tube which crosses the bottom of said vessel and has egress-openings through said bottom at or near the middle thereof, so as to create a draft in the said last-mentioned tubes and draw out of the vessel the odors and steam and permit of and promote the discharge of the same into the fire or their escape through the chimney or fire flue; second, to the combination, with the boiler having the stench-escape tubes, as described, of a steamer, vessel, or pan, constructed as hereinafter fully set forth.

Referring to the accompanying drawings, A represents the boiler, which is a vessel in the form of a pot adapted for boiling purposes, having a flat bottom, B, formed with a series of holes, $b\ b\ b$, which are aligned and communicate with a pipe or passage-way, C, fastened on the upper side of said bottom. This pipe C is open at its ends and communicates with two pipes or tubes, D D, which are secured to the outside of the pot A, their upper ends having communication with two openings, $a\ a$, near the upper edge of the pot. By means of these pipes C and D D a draft is created, which has the effect of drawing out of the vessel through the openings $a\ a$ the odors and steam which arise from the vegetables or other articles being boiled or cooked in said pot, which odors, &c., escape through the openings $b\ b\ b$ in the bottom. Inasmuch as the holes $b\ b\ b$ in the bottom of the pot are some distance removed from the outer edge of said bottom, the pot may be placed on the top of the stove or range and over one of the holes in said top, yet without fitting down therein, and still produce the desired effect of drawing the odors and steam and promoting the discharge of the same into the fire or their escape up the chimney. Hence the pot does not require to be made of any particular dimensions to fit any sized hole, as the described operation will proceed effectively with the pot merely resting over the hole and not fitting down therein.

E E are two other pipes or tubes externally applied to the sides of the pot A, and communicating at both their upper and lower ends internally with the vessel through openings F and G in said sides, the openings F being near the top of the pot, yet below the plane of the openings for the tubes D D, and the openings G being near the bottom B. Through these pipes E E an upward circulation of the boiling water is secured, as hereinafter set forth.

H represents a pan-shaped vessel, the bottom of which is formed with holes $h$, as shown, the diameter of said vessel or pan being such that it fits tightly or snugly with its upper edge against the surrounding wall of the pot, the openings G in the sides of the latter coming below the rim $h'$ of said vessel H. The latter is provided with a bail or handle, $h^2$, by means of which it may be lifted out of the pot and held while straining or draining its contents. This vessel H is not only a strainer or drainer, but also causes or promotes the circulation of the boiling water through the pipes. In operation the amount of water placed in the vessel A is such as that it will come just above the top of the openings G G, which lead to the pipes E E. As the rim of the strainer H comes above this line and fits tightly against the sides of the pot, when the water begins to boil it cannot rise up around the rim of said strainer, nor can it pass in sufficient volume through said strainer, as the latter, being filled with the article to be cooked or boiled, impedes the ascent of the water in that direction. Hence the water, finding a free passage through the pipes E E, ascends through the latter and pours out of the same through the openings F, a very salutary circulation of the boiling water being thus produced.

I represents another vessel, which I call the "steamer," and which is in the form of a pan with openings in its sides and bottom, either or both. The rim $i$ of this vessel rests upon lugs $k\ k$ on the inner sides of the walls of the pot or boiler, these lugs being so placed that said rim will be some distance above the plane of the openings F F, in order that the water discharged from the circulating-tubes E E will not pass or be discharged into the steamer, but will pass into the pot below said strainer, or between the latter and the sides of the pot. The steam ascending from water placed below in the vessel A passes upwardly through the openings in the bottom and sides of the steamer I, and after performing its operations passes outwardly through the draft-pipes D D and C, and escapes into the fire or up the chimney.

The pot A may be used for steaming purposes alone, in which case the strainer is not necessary. It may also be used without either the strainer or steamer, and simply as a boiler; but in every case the odors and steam arising from the articles being cooked will be drawn out of the vessel and discharged into the fire, to be either consumed therein or wafted up the chimney, the use of the utensil thus protecting the atmosphere of the kitchen from the contaminating influences of offensive odors and an excess of moisture in the form of steam.

A tight lid, L, of the usual construction in pots or boilers, is used.

The pot may be either a casting or formed of sheet metal, and is preferably the latter, and may have either a bail or handles.

I am aware that circulating water-pipes and draft-tubes for the escape of stench, &c., have been heretofore used in culinary and other vessels; hence I do not broadly claim the same, but limit my claims to the special features of construction hereinafter claimed.

The object of placing the pipe C on the bottom is to lead the odors to the very center of the vessel and to the middle of the pot-holes, no matter what may be the diameter of the latter, so that should the pot-holes be of less diameter than the bottom of the vessel the escaping odors will not rise around the bottom of the vessel, as would be the result if the tubes at the side of the vessel opened directly at their lower ends.

The object of placing the pipe C on the upper side of the bottom is to leave the under side of said bottom flat, so that it will stand steadily.

The pipes E are attached to the outside of the vessel, so as to avoid the necessity of notching the strainer.

In an application filed by me the 3d day of June, 1884, Serial No. 133,718, I have shown and described a culinary vessel and have made claims therein to several features embraced as parts of the vessel constituting the subject of the present application—to wit, a vessel having a removable strainer and provided with tubes, one set of which open at both ends into the vessel, while the other set have communication with the interior of the vessel at their upper ends only; hence I herein disclaim such construction, broadly, and limit myself to the matter specifically claimed.

What I claim as my invention is as follows:

1. The pot or vessel A, having holes in the bottom communicating with a pipe, C, on said bottom, said pipe extending completely across the bottom and being connected with pipes D D at each end, which communicate with the interior of the said pot or vessel, substantially as shown, and for the purpose set forth.

2. The pot or boiler A, having a series of external pipes, two of which connect with a transverse pipe on the bottom, which bottom has holes which communicate with said transverse pipe, and the other pipes having internal communication at their upper and lower ends with the interior of said vessel, substantially as shown and described.

3. The combination, with the pot or vessel A, provided with the externally-applied pipes E E, having internal communication with said vessel, of the steamer I and the steamer-supporting lugs $k\ k$, located in a plane above the discharging upper openings, F F, of said pipes E E, substantially as shown and described, and for the purpose set forth.

In testimony that I claim the foregoing I have hereunto set my hand this 5th day of September, 1884.

WILLIAM H. PAYNE.

Witnesses:
ISAIAH MATLACK,
M. D. CONNOLLY.